(12) United States Patent
Kondo et al.

(10) Patent No.: US 8,532,851 B2
(45) Date of Patent: Sep. 10, 2013

(54) TRAIN INFORMATION DISPLAY SYSTEM AND TRAIN INFORMATION DISPLAY DEVICE

(75) Inventors: Tetsu Kondo, Chiyoda-ku (JP); Masao Oki, Chiyoda-ku (JP)

(73) Assignee: Mitsubishi Electric Corporation, Chiyoda-Ku, Tokyo (JP)

( * ) Notice: Subject to any disclaimer, the term of this patent is extended or adjusted under 35 U.S.C. 154(b) by 216 days.

(21) Appl. No.: 13/201,145

(22) PCT Filed: Mar. 9, 2009

(86) PCT No.: PCT/JP2009/054455
§ 371 (c)(1),
(2), (4) Date: Aug. 11, 2011

(87) PCT Pub. No.: WO2010/103608
PCT Pub. Date: Sep. 16, 2010

(65) Prior Publication Data
US 2012/0001029 A1   Jan. 5, 2012

(30) Foreign Application Priority Data
Sep. 13, 2007 (JP) .................................. 2007-238359

(51) Int. Cl.
*G05D 1/00* (2006.01)
*G05D 3/00* (2006.01)

(52) U.S. Cl.
USPC .............................. 701/19; 701/423; 701/467

(58) Field of Classification Search
USPC ........................................... 701/19, 423, 467
See application file for complete search history.

(56) References Cited

U.S. PATENT DOCUMENTS

| 6,179,252 B1* | 1/2001 | Roop et al. .................... 246/293 |
| 6,700,504 B1* | 3/2004 | Aslandogan et al. ......... 340/901 |
| 7,928,864 B2* | 4/2011 | Park .............................. 340/994 |
| 2004/0249568 A1* | 12/2004 | Endo et al. .................... 701/209 |
| 2005/0131631 A1* | 6/2005 | Nakano et al. ................ 701/200 |

FOREIGN PATENT DOCUMENTS

| CN | 101032973 A | 9/2007 |
| GB | 2468745 A * | 9/2010 |
| JP | 2001-278050 A | 10/2001 |
| JP | 2001-312238 A | 11/2001 |
| JP | 2002-127905 A | 5/2002 |

(Continued)

OTHER PUBLICATIONS

JP 2004-021579 English translation, publication date Jan. 2004, all pages.*
JP 2002-127905 English translation, publication date May 2002, all pages.*
International Search Report (PCT/ISA/210) issued on Jun. 16, 2009, by Japanese Patent Office as the International Searching Authority for International Application No. PCT/JP2009/054455.

(Continued)

*Primary Examiner* — Calvin Cheung
(74) *Attorney, Agent, or Firm* — Buchanan Ingersoll & Rooney PC

(57) ABSTRACT

In a train information display system that displays an operation information on each train in a train, a ground system adds the information on the degree of influence on the passengers of each train to the operation information, and transmits the resultant operation information to a transmission-reception device. A content data server stores in advance, as normal-time display information, at least one of advertisement information and destination guidance information that are to be displayed during normal operations. Instruction output devices instruct content display units to display the operation information and normal-time display information in a display sequence corresponding to the influence information received by the transmission-reception device.

19 Claims, 16 Drawing Sheets

(56) References Cited

FOREIGN PATENT DOCUMENTS

| | | | |
|---|---|---|---|
| JP | 2004-021579 | A | 1/2004 |
| JP | 2004-058734 | A | 2/2004 |
| JP | 2004-070254 | A | 3/2004 |
| JP | 2006-273216 | A | 10/2006 |
| JP | 2008271678 | * | 11/2008 |
| JP | 2009-037609 | A | 2/2009 |
| TW | I257358 | B | 7/2006 |

OTHER PUBLICATIONS

Written Opinion (PCT/ISA/237) issued on Jun. 16, 2009, by Japanese Patent Office as the International Searching Authority for International Application No. PCT/JP2009/054455.

Office Action issued on Jun. 16, 2011, by Taiwanese Patent Office for Application No. 098108004.

* cited by examiner

FIG.7

<DISPLAY SEQUENCE (s4)>
DOOR-OPENING SIDE                                                             91A

| DISPLAY TIMING | ADVERTISEMENT DISPLAY UNIT | DESTINATION GUIDANCE DISPLAY UNIT | |
| --- | --- | --- | --- |
| | | GUIDANCE AREA A | GUIDANCE AREA B |
| STOPPING AT STATION | | WE ARE AT AA STATION | GUIDANCE CONTENT A1 |
| RUNNING | ADVERTISEMENT DISPLAY | THE NEXT STATION IS BB | GUIDANCE CONTENT B1 |
| | | | GUIDANCE CONTENT B2 |
| | | | GUIDANCE CONTENT B3 |
| | | | GUIDANCE CONTENT B4 |
| | | | GUIDANCE CONTENT B5 |
| | | | GUIDANCE CONTENT B6 |
| | | | GUIDANCE CONTENT B7 |
| BEFORE ARRIVAL AT NEXT STATION | | WE WILL SOON ARRIVE AT BB | GUIDANCE CONTENT C |

FIG.8

<DISPLAY SEQUENCE (s4)>
CLOSED-DOOR SIDE                                                              91B

| DISPLAY TIMING | ADVERTISEMENT DISPLAY UNIT | DESTINATION GUIDANCE DISPLAY UNIT | |
| --- | --- | --- | --- |
| | | GUIDANCE AREA A | GUIDANCE AREA B |
| STOPPING AT STATION | | WE ARE AT AA STATION | GUIDANCE CONTENT A1 |
| RUNNING | ADVERTISEMENT DISPLAY | THE NEXT STATION IS BB | GUIDANCE CONTENT B1 |
| | | | GUIDANCE CONTENT B2 |
| | | | GUIDANCE CONTENT B3 |
| | | | GUIDANCE CONTENT B4 |
| | | | GUIDANCE CONTENT B5 |
| | | | GUIDANCE CONTENT B6 |
| | | | GUIDANCE CONTENT B7 |
| BEFORE ARRIVAL AT NEXT STATION | | WE WILL SOON ARRIVE AT BB | GUIDANCE CONTENT C |

FIG.9

<DISPLAY SEQUENCE (s1)>
DOOR-OPENING SIDE 201A

| DISPLAY TIMING | ADVERTISEMENT DISPLAY UNIT | DESTINATION GUIDANCE DISPLAY UNIT | |
|---|---|---|---|
| | | GUIDANCE AREA A | GUIDANCE AREA B |
| STOPPING AT STATION | OPERATION-SUSPENDED ROUTE MAP | WE ARE AT AA STATION | OPERATION INFORMATION |
| RUNNING | OPERATION-SUSPENDED ROUTE MAP | THE NEXT STATION IS BB | OPERATION INFORMATION |
| | | | GUIDANCE CONTENT B1 |
| | | | GUIDANCE CONTENT B2 |
| BEFORE ARRIVAL AT NEXT STATION | OPERATION-SUSPENDED ROUTE MAP | WE WILL SOON ARRIVE AT BB | OPERATION INFORMATION |
| | | | GUIDANCE CONTENT C2 |

FIG.10

<DISPLAY SEQUENCE (s1)>
CLOSED-DOOR SIDE 201B

| DISPLAY TIMING | ADVERTISEMENT DISPLAY UNIT | DESTINATION GUIDANCE DISPLAY UNIT | |
|---|---|---|---|
| | | GUIDANCE AREA A | GUIDANCE AREA B |
| STOPPING AT STATION | OPERATION-SUSPENDED ROUTE MAP | WE ARE AT AA STATION | OPERATION INFORMATION |
| RUNNING | OPERATION-SUSPENDED ROUTE MAP | THE NEXT STATION IS BB | OPERATION INFORMATION |
| | | | GUIDANCE CONTENT B1 |
| | | | GUIDANCE CONTENT B2 |
| BEFORE ARRIVAL AT NEXT STATION | OPERATION-SUSPENDED ROUTE MAP | WE WILL SOON ARRIVE AT BB | OPERATION INFORMATION |
| | | | GUIDANCE CONTENT C2 |

FIG.11

<DISPLAY SEQUENCE (s2)>
DOOR-OPENING SIDE                                          202A

| DISPLAY TIMING | ADVERTISEMENT DISPLAY UNIT | DESTINATION GUIDANCE DISPLAY UNIT | |
| --- | --- | --- | --- |
| | | GUIDANCE AREA A | GUIDANCE AREA B |
| STOPPING AT STATION | OPERATION-SUSPENDED ROUTE MAP | WE ARE AT AA STATION | OPERATION INFORMATION |
| RUNNING | ADVERTISEMENT DISPLAY | THE NEXT STATION IS BB | GUIDANCE CONTENT B1 |
| | | | GUIDANCE CONTENT B2 |
| | | | GUIDANCE CONTENT B3 |
| | OPERATION-SUSPENDED ROUTE MAP | | OPERATION INFORMATION |
| | ADVERTISEMENT DISPLAY | | GUIDANCE CONTENT B4 |
| | | | GUIDANCE CONTENT B5 |
| | | | GUIDANCE CONTENT B6 |
| | | | GUIDANCE CONTENT B7 |
| BEFORE ARRIVAL AT NEXT STATION | ADVERTISEMENT DISPLAY | WE WILL SOON ARRIVE AT BB | GUIDANCE CONTENT C1 |
| | | | GUIDANCE CONTENT C2 |

FIG.12

<DISPLAY SEQUENCE (s2)>
CLOSED-DOOR SIDE                                              202B

| DISPLAY TIMING | ADVERTISEMENT DISPLAY UNIT | DESTINATION GUIDANCE DISPLAY UNIT ||
| --- | --- | --- | --- |
| | | GUIDANCE AREA A | GUIDANCE AREA B |
| STOPPING AT STATION | OPERATION-SUSPENDED ROUTE MAP | WE ARE AT AA STATION | OPERATION INFORMATION |
| RUNNING | OPERATION-SUSPENDED ROUTE MAP | THE NEXT STATION IS BB | OPERATION INFORMATION |
| | ADVERTISEMENT DISPLAY | | GUIDANCE CONTENT B1 |
| | | | GUIDANCE CONTENT B2 |
| | | | GUIDANCE CONTENT B3 |
| | OPERATION-SUSPENDED ROUTE MAP | | OPERATION INFORMATION |
| | ADVERTISEMENT DISPLAY | | GUIDANCE CONTENT B4 |
| | | | GUIDANCE CONTENT B5 |
| | | | GUIDANCE CONTENT B6 |
| | | | GUIDANCE CONTENT B7 |
| BEFORE ARRIVAL AT NEXT STATION | ADVERTISEMENT DISPLAY | WE WILL SOON ARRIVE AT BB | GUIDANCE CONTENT C1 |
| | | | GUIDANCE CONTENT C2 |

FIG.13

<DISPLAY SEQUENCE (s3)>
DOOR-OPENING SIDE                                                        203A

| DISPLAY TIMING | ADVERTISEMENT DISPLAY UNIT | DESTINATION GUIDANCE DISPLAY UNIT | |
| --- | --- | --- | --- |
| | | GUIDANCE AREA A | GUIDANCE AREA B |
| STOPPING AT STATION | ADVERTISEMENT DISPLAY | WE ARE AT AA STATION | GUIDANCE CONTENT A1 |
| RUNNING | ADVERTISEMENT DISPLAY | THE NEXT STATION IS BB | OPERATION INFORMATION |
| | | | GUIDANCE CONTENT B1 |
| | | | GUIDANCE CONTENT B2 |
| | | | GUIDANCE CONTENT B3 |
| | | | OPERATION INFORMATION |
| | | | GUIDANCE CONTENT B4 |
| | | | GUIDANCE CONTENT B5 |
| | | | GUIDANCE CONTENT B6 |
| | | | GUIDANCE CONTENT B7 |
| BEFORE ARRIVAL AT NEXT STATION | ADVERTISEMENT DISPLAY | WE WILL SOON ARRIVE AT BB | GUIDANCE CONTENT C1 |
| | | | GUIDANCE CONTENT C2 |

FIG.14

<DISPLAY SEQUENCE (s3)>
CLOSED-DOOR SIDE                                                              203B

| DISPLAY TIMING | ADVERTISEMENT DISPLAY UNIT | DESTINATION GUIDANCE DISPLAY UNIT ||
|---|---|---|---|
| | | GUIDANCE AREA A | GUIDANCE AREA B |
| STOPPING AT STATION | ADVERTISEMENT DISPLAY | WE ARE AT AA STATION | OPERATION INFORMATION |
| RUNNING | ADVERTISEMENT DISPLAY | THE NEXT STATION IS BB | OPERATION INFORMATION |
| | | | GUIDANCE CONTENT B1 |
| | | | GUIDANCE CONTENT B2 |
| | | | GUIDANCE CONTENT B3 |
| | | | OPERATION INFORMATION |
| | | | GUIDANCE CONTENT B4 |
| | | | GUIDANCE CONTENT B5 |
| | | | GUIDANCE CONTENT B6 |
| | | | GUIDANCE CONTENT B7 |
| BEFORE ARRIVAL AT NEXT STATION | ADVERTISEMENT DISPLAY | WE WILL SOON ARRIVE AT BB | GUIDANCE CONTENT C1 |
| | | | GUIDANCE CONTENT C2 |

| OPERATION-SUSPENDED SECTION CODE | ROUTE | OPERATION-SUSPENDED SECTION | DISPLAYED ROUTE NAME |
|---|---|---|---|
| 001 | AA | A1 TO A3 | AA |
| 002 | AA | A3 TO A4 | AA |
| 003 | BB | B1 TO B3 | BB |
| 004 | BB | B2 TO A4 | BB |
| 005 | BB | A4 TO B4 | BB |
| 006 | BB | C1 TO B1 | CC |
| 007 | DD | D1 TO B2 | DD |
| 008 | DD | B2 TO D6 | DD |

FIG.19

OPERATION INFORMATION — 104

| ROUTE | SECTION | DIRECTION | STATUS | CAUSE |
|---|---|---|---|---|
| AA | A1 TO A3 | INBOUND | OPERATIONS SUSPENDED | SNOW |
| BB | B2 TO A4 | INBOUND AND OUTBOUND | OPERATIONS SUSPENDED | ACCIDENT |
| DD | D1 TO B2 | OUTBOUND | OPERATIONS RESUMED | SNOW |
| ⋮ | ⋮ | ⋮ | ⋮ | ⋮ |

TRAIN INFORMATION DISPLAY SYSTEM AND TRAIN INFORMATION DISPLAY DEVICE

TECHNICAL FIELD

The present invention relates to a train information display system for displaying information on train operation status and to a train information display device.

BACKGROUND ART

Railways are used by a large number of people as transportation means, but an accident, disaster, and the like may cause delays in the operations of trains. The information on the operation status (operation information) such as delays in the operations of trains must be notified immediately to the passengers. Conventionally, display devices (display mediums) such as LCDs (Liquid Crystal Displays) are placed on the upper lintels of the doors of train vehicles, and operation information, such as delays in operations, is displayed on the display devices.

For example, in a train-mounted video information distribution display system described in Patent Literature 1, commercial videos and the like are repeatedly displayed in a predetermined sequence unless an interrupt signal is received. If an interrupt signal is received, a determination is made as to whether or not the priority of the type of the video information relating the interrupt signal is higher than the priority of the type of the currently displayed video information. If the priority of the type of the video information for the new interrupt signal is higher than the priority of the type of the currently displayed video information, the display of the currently displayed information is interrupted, and the information for the new interrupt signal is displayed.

Patent Literature 1: Japanese Patent Application Laid-open No. 2002-127905

DISCLOSURE OF INVENTION

Problem to be Solved by the Invention

In the above conventional technique, identical operation information is displayed on all trains irrespective of whether or not the information received by a train has an influence on the passengers thereof. Therefore, unnecessary operation information is displayed also on trains not directly related to the operation information. This causes the problem in that the time for displaying information, such as advertisement and guidance, other than the operation information is reduced.

The present invention has been made in view of the above, and it is an object of the invention to obtain a train information display system and a train information display device that can efficiently display train operation information according to the degree of influence on the passengers of the train.

Means for Solving Problem

A train information display system according to an aspect of the present invention, includes: an operation information distribution system that distributes operation information on a train operation status of each of trains on a route; and a train information display device that receives the operation information from the operation information distribution system and displays the operation information in a vehicle of an own train on which the train information display device is arranged, wherein the operation information distribution system determines a degree of influence due to the train operation status included in the operation information on a passenger of a train to which the operation information is to be transmitted, adds a determination result of the degree of influence to the operation information as influence information, and transmits the resultant operation information to the train information display device, and the train information display device includes a receiving unit that receives, from the operation information distribution system, the operation information to which the influence information has been added, an operation information storage unit that stores in advance, as normal-time display information, at least one of advertisement information and destination guidance information that are to be displayed during normal operations and are different from the operation information, an instruction output device that, when the receiving unit receives the operation information, outputs a display instruction for displaying the operation information and the normal-time display information in a display sequence corresponding to the influence information, and a display unit that displays the operation information and the normal-time display information in the display sequence based on the display instruction from the instruction output device.

Effect of the Invention

According to the present invention, the operation information on a train is displayed in a display sequence according to the degree of influence of train operation status on passengers. Therefore, advantageously, the operation information can be efficiently displayed according to the degree of influence of the train operation status on the passengers.

BRIEF DESCRIPTION OF DRAWINGS

FIG. 7 is a diagram showing one example of the display sequence (on a door-opening side) during normal operations.

FIG. 8 is a diagram showing one example of the display sequence (on a closed-door side) during normal operations.

FIG. 9 is a diagram showing one example of the display sequence (on the door-opening side) when the degree of influence on passengers is significant.

FIG. 10 is a diagram showing one example of the display sequence (on the closed-door side) when the degree of influence on the passengers is significant.

FIG. 11 is a diagram showing one example of the display sequence (on the door-opening side) when the degree of influence on the passengers is large.

FIG. 12 is a diagram showing one example of the display sequence (on the closed-door side) when the degree of influence on the passengers is large.

FIG. 13 is a diagram showing one example of the display sequence (on the door-opening side) when the degree of influence on the passengers is small.

FIG. 14 is a diagram showing one example of the display sequence (on the closed-door side) when the degree of influence on the passengers is small.

FIG. 19 is a diagram showing an example of the display when a plurality of pieces of operation information are simultaneously displayed.

EXPLANATIONS OF LETTERS OR NUMERALS

Figure 1:
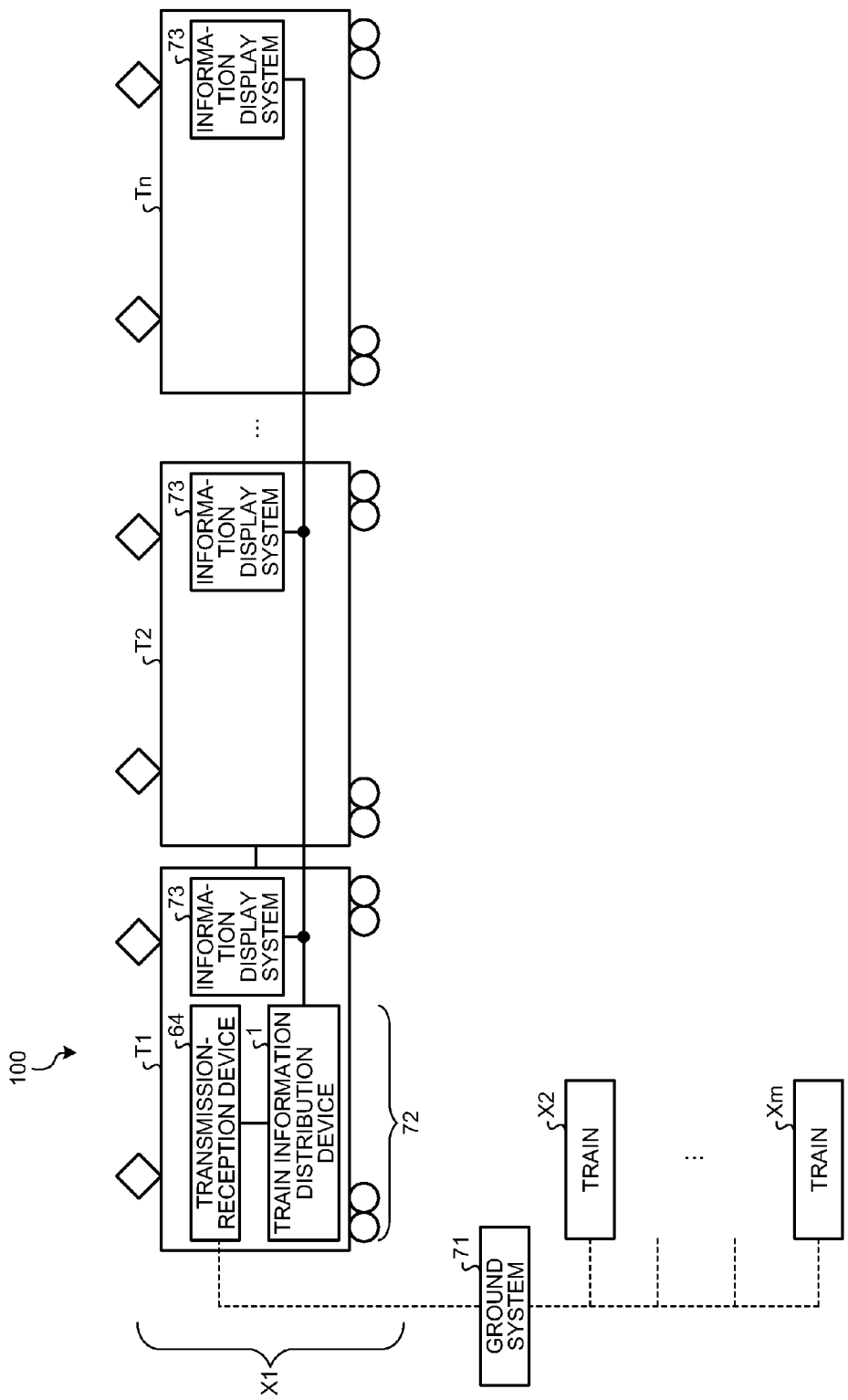
FIG. 1 is a diagram illustrating the schematic structure of a train information distribution system according to a first embodiment.

1 Train information distribution device
3 Train information device
11, 21 Display sequence reading circuit
12, 22 Display instruction circuit
13, 23 Interrupt generation circuit
14, 24 Display sequence storage circuit
41 to 44 Instruction output device
51 to 54 Content display unit
61 Operation information distribution center
62 Operation information distribution unit
63 Advertisement information distribution unit
64 Transmission-reception device
65 Content data server
67 Communication line
68 Packet transmission line
69 High-capacity data transmission line
71 Ground system
72 Central control system
73 Information display system
75 Vehicle-mounted system
81 Display area
82 Guidance area A
83 Guidance area B
91A, 91B Sequence information
100 Train information distribution system
102 Influence information table
103-1 to 103-M Operation information
104 Operation information list
201A, 201B, 202A, 202B, 203A, 203B Sequence information
T1 to Tn Vehicles
X1 to Xm Trains

BEST MODE(S) FOR CARRYING OUT THE INVENTION

Embodiments of a train information display system and a train information display device according to the present invention will next be described in detail with reference to the drawings. However, the invention is not limited to these embodiments.

First Embodiment

FIG. 1 is a diagram illustrating the schematic structure of a train information distribution system according to the first embodiment of the present invention. The train information distribution system (train information display system) 100 is configured to include a plurality of trains X1 to Xm (m is a natural number) and a ground system (operation information distribution system) 71.

The ground system 71 includes a device for distributing train operation information (the information on operation status), advertisement information (the information on advertisement), guidance information (the information on various types of guidance), and the like to the trains X1 to Xm. The ground system 71 communicates with each of the trains X1 to Xm via, for example, radio communication. All the trains X1 to Xm have the same configuration, and the train X1 will be described as an example.

The train X1 includes one to a plurality of vehicles T1 to Tn (n is a natural number). A transmission-reception device 64 for transmitting/receiving information to/from the ground system 71 and a train information distribution device 1 for relaying information (such as operation information) received by the transmission-reception device 64 to each of the vehicles T1 to Tn are arranged on the front vehicle T1 of the train X1, these units collectively serving as a central control system 72. An information display system 73 connected to the train information distribution device 1 is provided in each of the vehicles T1 to Tn. Each information display system 73 displays advertisement information, guidance information, operation information distributed from the train information distribution device 1, and the like. The central control system 72 and one or a plurality of the information display systems 73 (in the trains X1 to Xm) correspond to the train information display device recited in claims.

In the present embodiment, when an accident, for example, occurs in a line, the train information distribution device 1 causes each of the information display systems 73 to display, on the basis of the degree of influence on the passengers of the train X1, operation information and the like in predetermined display sequences based on the degree of influence.

Figure 2:
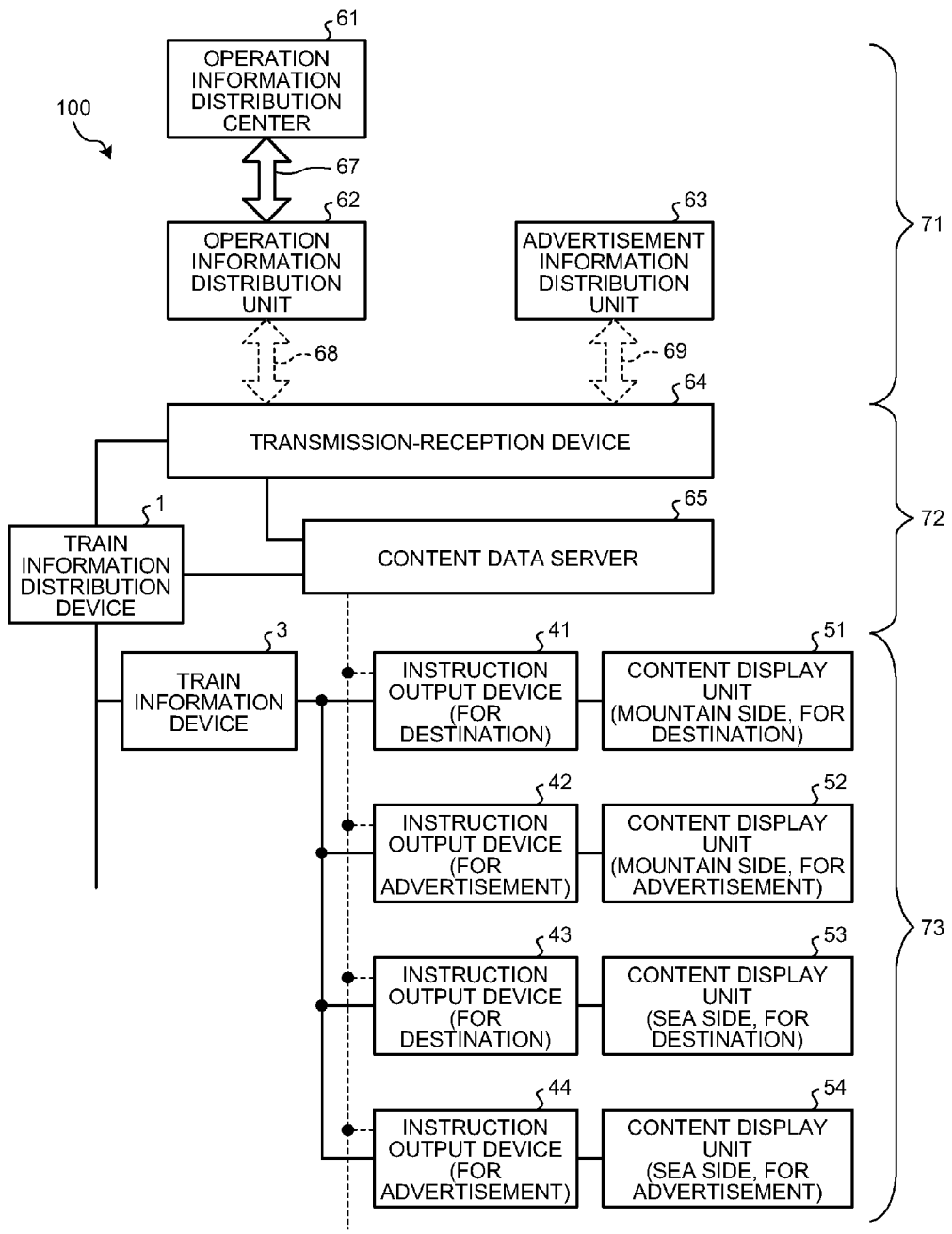
FIG. 2 is a block diagram illustrating the structure of the train information distribution system according to the first embodiment.

The detailed structure of the train information distribution system 100 will next be described. FIG. 2 is a block diagram illustrating the structure of the train information distribution system according to the embodiment of the present invention. In the structure shown in FIG. 2, the vehicle T1 of the train X1 is wireless-connected to the ground system 71.

The train information distribution system 100 in FIG. 2 includes the ground system 71, the central control system 72 on the train X1, and the information display system 73 on the vehicle T1. The ground system 71 is a ground-based facility, and the central control system 72 and the information display system 73 are vehicle-mounted facilities arranged on the train X1.

The ground system 71 is configured to include an operation information distribution center 61, operation information distribution unit 62 and advertisement information distribution unit 63. The operation information distribution center (operation information distribution unit) 61 is connected to the operation information distribution unit 62 via a (wire or wireless) communication line 67, and various types of information are transmitted and received between the operation information distribution center 61 and the operation information distribution unit 62. The operation information distribution center 61 generates operation information (for example, information on the route that has suspended operations)

when, for example, an accident has occurred. Then the operation information distribution center 61 transmits the generated operation information to the operation information distribution unit 62. A single piece of operation information is transmitted from the operation information distribution center 61 to the operation information distribution unit 62.

The operation information distribution unit 62 analyzes the operation information from the operation information distribution center 61 and determines, according to the analysis results, the influence of the operation status (for example, the information on the suspended operations) in the operation information on the passengers of each train to which the information is to be transmitted. Then the operation information distribution unit 62 adds information (the results of the determination of the degree of influence, i.e., influence information) suitable for each transmission destination train to the operation information from the operation information distribution center 61 and transmits the resultant operation information to each of the trains. The influence information added to the operation information is, for example, information indicating whether the operations have been suspended for the own route or the other route(s), or the degree of influence (for example, significant or medium) of the operation status on passengers.

The operation information distribution unit 62 transmits and receives information to and from the transmission-reception device 64 of the central control system 72 (on the front vehicle T1 of the train X1) via, for example, a packet transmission line 68. Operation information, for example, is transmitted from the operation information distribution unit 62 to the transmission-reception device 64.

The advertisement information distribution unit 63 transmits-receives information to-from the transmission-reception device 64 of the central control system 72 via, for example, a high-capacity data transmission line 69. For example, advertisement information and guidance information (such as destination guidance and transfer guidance) are transmitted from the advertisement information distribution unit 63 to the transmission-reception device 64.

The central control system 72 includes the transmission-reception device 64, a content data server 65, and the train information distribution device 1. The transmission-reception device 64, the content data server 65, and the train information distribution device 1 are mutually connected via wire communication.

The transmission-reception device 64 receives operation information, advertisement information, and guidance information from the operation information distribution unit 62 and the advertisement information distribution unit 63. The transmission-reception device 64 transmits the received advertisement information (video images) to the content data server 65. The transmission-reception device 64 also transmits the received advertisement information (still images) and guidance information to instruction output devices 41 to 44 through the content data server 65. The transmission-reception device 64 further transmits the received operation information to the instruction output devices 41 to 44 through the train information distribution device 1 and a train information device 3.

The train information distribution device 1 is connected to the train information device 3 of the information display system 73 and relays the operation information transmitted from the transmission-reception device 64 to the train information device 3. The train information distribution device 1 is also connected to the content data server 65 of the central control system 72.

The content data server 65 stores the advertisement information from the transmission-reception device 64 in advance. The content data server 65 creates display images to be displayed on the content display units (display units) 51 to 54 using the advertisement information from the transmission-reception device 64, the display images being created for each of the content display units 51 to 54. The content data server 65 inputs the information on the crated display images to the instruction output devices 41 to 44 of the information display system 73.

The information display system 73 is arranged on each vehicle (such as the vehicle T1) and displays the operation information, advertisement information, and guidance information. Each information display system 73 includes the train information device 3, the instruction output devices 41 to 44, and the content display units 51 to 54.

The train information device 3 is connected to each of the instruction output devices 41 to 44, and inputs the operation information transmitted through the train information distribution device 1 to the instruction output devices 41 to 44. The instruction output device 41 (for a destination) is connected to the content display units 51 (on a mountain side and for the destination), and the instruction output device 42 (for advertisement) is connected to the content display units 52 (on the mountain side and for advertisement). The instruction output device 43 (for the destination) is connected to the content display units 53 (on a sea side and for the destination), and the instruction output device 44 (for advertisement) is connected to the content display unit 54 (on the sea side and for advertisement). The instruction output devices 41 to 44 control the displays on the content display units 51 to 54, respectively. The instruction output devices 41 to 44 determine, according to the influence information added to the operation information, display sequences based on the influence information and instruct the content display units 51 to 54 to display the operation information in the determined display sequences.

Each of the content display units 51 to 54 is configured to include display means such as an LCD. The content display units 51 to 54 display the advertisement information (video images) from the content data server 65 and also display the advertisement information (still images), guidance information, and operation information from the instruction output devices 41 to 44.

The content display units 51 is a display unit arranged near a door on the mountain side of the vehicle T1 and displays guidance information such as the destination during normal operations (i.e., when it is not necessary to display operation information). The content display units 52 is a display unit arranged near the door on the mountain side of the vehicle T1 and displays advertisement information during normal operations.

The content display unit 53 is a display unit arranged near a door on the sea side of the vehicle T1 and displays guidance information such as the destination during normal operations. The content display unit 54 is a display unit arranged near the door on the sea side of the vehicle T1 and displays advertisement information during normal operations. One of the mountain side and the sea side is the right side in the running direction of the train, and the other is the left side in the running direction.

The content display unit 51 is arranged, for example, on the right of the content display unit 52, and the content display unit 53 is arranged, for example, on the right of the content display unit 54. The display image for the content display unit 51 and the display image for the content display unit 52 are displayed side by side near the door on the mountain side (in a display area 81 described later). The display image for the content display unit 53 and the display image for the content display unit 54 are displayed side by side near the door on the sea side (in a display area 81).

In the description in FIG. 2, the information display system 73 includes four instruction output devices and four content display units. Alternatively, each information display system 73 may be configured to include three or less or five or more instruction output devices and three or less or five or more content display units. Each of the content display units 51 to 54 may be arranged at any position in the vehicle T1.

Figure 3:
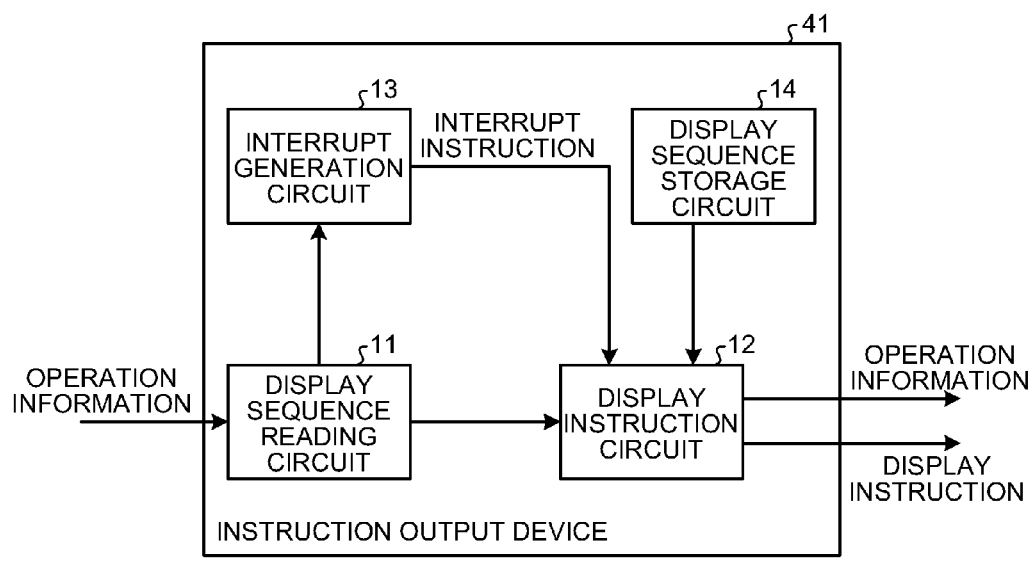
FIG. 3 is a block diagram illustrating the structure of an instruction output device according to the first embodiment.

The detailed structure of the instruction output devices 41 to 44 will next be described. The instruction output devices 41 to 44 have the same structure, and therefore the instruction output device 41 will be described as an example. FIG. 3 is a block diagram illustrating the structure of the instruction output device. The instruction output device 41 includes a display sequence reading circuit 11, an interrupt generation circuit 13, a display instruction circuit 12, and a display sequence storage circuit (display sequence storage unit) 14. The display sequence reading circuit 11 is connected to the interrupt generation circuit 13 and the display instruction circuit 12, and the display instruction circuit 12 is connected to the display sequence storage circuit 14.

The instruction output device 41 determines, according to the operation information transmitted from the transmission-reception device 64, the sequence for displaying the operation status indicated in the operation information. The display sequence reading circuit 11 inputs the determination result to the interrupt generation circuit 13. For example, if an accident has occurred in the operation route of the train X1, the display sequence reading circuit 11 inputs, to the interrupt generation circuit 13, an instruction indicating that the operation information and the like are to be displayed in a display sequence s1 (described later) determined on the basis of the influence information (the influence on the own route: significant) transmitted from the ground system 71. The display sequence reading circuit 11 transmits the operation information from the transmission-reception device 64 to the display instruction circuit 12.

The interrupt generation circuit 13 is a circuit that, upon reception of the display sequence used for display from the display sequence reading circuit 11, issues an interrupt instruction to the display instruction circuit 12. The display sequence storage circuit 14 is a circuit for storing the display sequence for normal-time display information (advertisement information and guidance information) to be displayed during normal operations and the display sequence for operation information, advertisement information, and guidance information that are to be displayed when a trouble has occurred. The display sequence storage circuit 14 stores various display sequences for respective degrees of influence on passengers in advance.

The display instruction circuit 12 is a circuit that allows the display of the operation information, advertisement information, and guidance information in predetermined order in one of the display sequences stored in the display sequence storage circuit 14. During normal operations, the display instruction circuit 12 causes the advertisement information and guidance information to be displayed in a display sequence used for a display during normal operations which are stored in the display sequence storage circuit 14.

Upon reception of an interrupt instruction from the interrupt generation circuit 13, the display instruction circuit 12 causes the operation information, advertisement information, and guidance information to be displayed in a display sequence (a display sequence based on the degree of influence on passengers) stored in the display sequence storage circuit 14.

Next, a description will be given of the operation information propagating throughout the train information distribution system 100. If an accident, for example, has occurred in a train route, operation information is transmitted from the operation information distribution center 61 to the trains X1 to Xm in the train information distribution system 100. The operation information transmitted from the operation information distribution center 61 is transmitted to the operation information distribution unit 62 through the communication line 67.

The operation information distribution unit 62 transmits the operation information to vehicle-mounted systems 75 through the packet transmission line 68. The central control system 72 and the information display system 73 shown in FIG. 2 correspond to such a vehicle-mounted system 75.

The transmission-reception device 64 of the vehicle-mounted system 75 (the central control system 72) receives the operation information from the ground system 71 (the operation information distribution unit 62). The transmission-reception device 64 transmits the received operation information to the instruction output devices 41 to 44 through the train information distribution device 1 and the train information device 3. The instruction output devices 41 to 44 determine display sequences according to the operation information and the influence information transmitted from the ground system 71 and instruct the content display units 51 to 54 to display the operation information.

The advertisement information and guidance information are transmitted from the operation information distribution center 61 through the operation information distribution unit 62 to the transmission-reception device 64. The advertisement information (video images) is stored in the content data server 65 and then transmitted to each of the content display units 51 to 54 from the content data server 65. Then the instruction output devices 41 to 44 instruct the content display units 51 to 54 to display the advertisement information (video images) from the content data server 65.

The guidance information and advertisement information (still images) are transmitted from the transmission-reception device 64 to the instruction output devices 41 to 44 and stored in the instruction output devices 41 to 44. The instruction output devices 41 to 44 instruct the content display units 51 to 54 to display the guidance information and advertisement information (still images) from the transmission-reception device 64, respectively.

Figure 4:
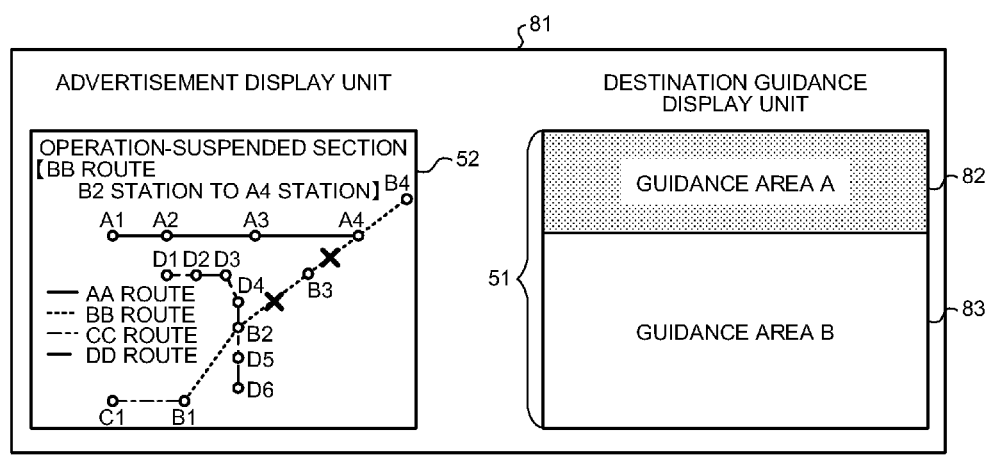
FIG. 4 is diagram illustrating one example of the displays displayed on content display units.

FIG. 4 is a diagram illustrating examples of display screens displayed on content display units. The display image on the content display unit (advertisement indicator) 52 and the display image on the content display unit (destination guidance indicator) 51 are displayed in a display area 81. During normal operations, advertisement information is displayed on the left-side display of the display area 81, and guidance information is displayed on the right-side display. Alternatively, during normal operations, the advertisement information may be displayed on the right-side display of the display area 81, and the guidance information may be displayed on the left-side display. When operation information is transmitted from the operation information distribution center 61 (when an accident, for example, has occurred), the information on an operation-suspended section is displayed on the screen for the advertisement information (the screen of the content display unit 53) (for example, over the entire screen). In addition, the operation information is displayed in a guidance area B 83 in the screen for the guidance information (the screen of the content display unit 51). Even when the operation information has been transmitted from the operation information distribution center 61, the guidance information (text characters such as kanji, roman, and hiragana letters) is displayed on a guidance area A 82 in the screen for the guidance information in the display area 81.

For example, in the information on the operation-suspended section displayed on the screen of the content display unit 53 and in the operation information displayed on the guidance area B 83, an accident, for example, that has occurred in the own route is displayed as the operation information on the own route, and an accident, for example, that has occurred in a route which is not shared by the own route (the route on which the own train does not run) is displayed as the operation information on the other route(s).

The information on the operation-suspended section and the operation information are received in an area in which the train X1 can wireless-communicate with the operation information distribution unit 62. In this case, the train X1 receives, as the operation information from the operation information distribution unit 62, the information on the degree of influence of the operation status on the passengers (the information indicating whether the operations of the own route or the other route(s) are suspended and the information (section code) indicating the operation-suspended section) and the like.

In the above exemplary description, the accident that has occurred in the own route is displayed as the operation information on the own route, and the accident that has occurred in the other route(s) which is not shared by the own route is displayed as the operation information on the other route(s). Alternatively, both the accident that has occurred in the own route and the accident that has occurred in the other route(s) may be displayed as the operation information on the own route.

Figures 5, 6:
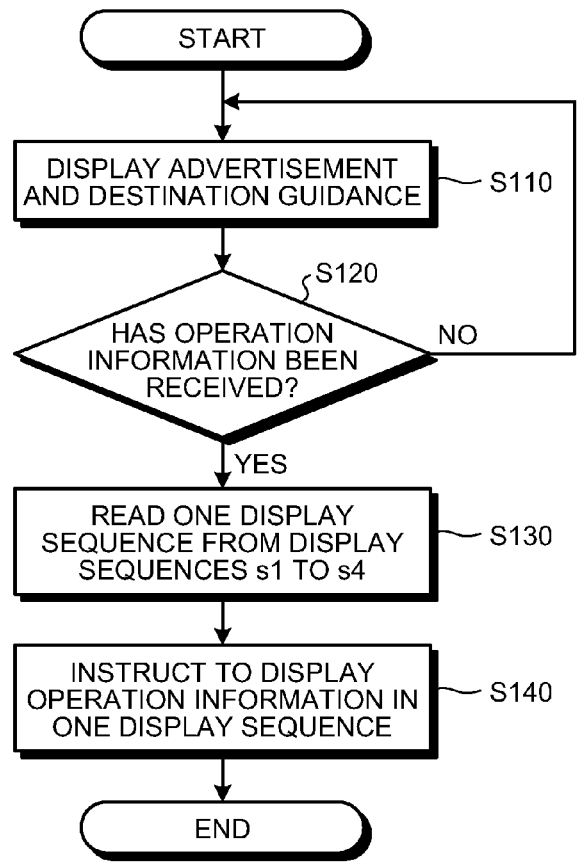
FIG. 5 is a flowchart showing the operation procedure in an instruction output device according to the first embodiment.
FIG. 6 is a diagram showing one example of the structure of an influence information table.

The operation procedure in the instruction output devices 41 to 44 will next be described. FIG. 5 is a flowchart showing the operation procedure in the instruction output devices. During normal operations, the display instruction circuits 12 of the instruction output devices 41 to 44 extract display sequences for normal operations from the display sequence storage circuits 14 and transmit display instructions (display instructions for displaying advertisement information and guidance information) based on the extracted display sequences to the content display units 51 to 54. The instruction output devices 41 to 44 receive advertisement information from the content data server 65 and instruct the content display units 51 to 54 to display the advertisement information and guidance information in predetermined sequences (display sequences for normal operations). The content display units 51 and 53 display guidance (such as destination guidance) corresponding to the guidance information, and the content display units 52 and 54 display advertisement corresponding to the advertisement information (step S110).

Then the display sequence reading circuit 11 of the instruction output device 41 monitors whether or not any operation information has been received from the operation information distribution center 61. If the display sequence reading circuit 11 has received no operation information (step S120: No), a determination result indicating no influence on the passengers is inputted to the display instruction circuit 12. Therefore, the display instruction circuits 12 continue the processing for transmitting, to the content display units 51 to 54, the instructions for displaying the advertisement information and guidance information in the display sequences for normal operations, which have been extracted from the display sequence storage circuit 14. The train information devices 3 transmit the display instructions to the instruction output devices 41 to 44, and the instruction output devices 41 to 44 instruct the content display units 51 to 54 to display the advertisement information and guidance information in the display sequences based on the display instructions, respectively (step S110).

If each display sequence reading circuit 11 receives operation information (step S120: yes), the display sequence reading circuit 11 determines which display sequence should be used for displaying the operation status indicated in the received operation information. The operation information received by the display sequence reading circuit 11 is information indicating that, for example, "the operations of the AA route have been suspended between A1 station and A3 station."

The display sequence reading circuits 11 in each train determine the degree of influence on the passengers on the basis of, for example, the determination as to whether the route in which, an accident or trouble due to weather has occurred is the own route (the route on which the own train runs) or another route (a route on which the own train does not run), of the suspension time of the operations (expected suspension time), or of the operation delay time of the train (step S130). In this process, with respect to an accident that has occurred in the other route(S) which is shared by the own route, the display sequence reading circuits 11 in each train may determine that it causes suspension of the operations of the own route or suspension of the operations of the other route(s).

Each display sequence reading circuit 11 in the present embodiment determines the degree of influence of the operation status on the passengers using, for example, an influence information table 102 shown in FIG. 6. FIG. 6 is a diagram showing an example of the structure of the influence information table. In the influence information table 102 in FIG. 6, the degree of influence of the operation status on the passengers is represented by four levels. Alternatively, the degree of influence of the operation status on the passengers may be represented by three or less levels or five or more levels.

The influence information table 102 is an information table in which the items, "display sequence," "degree of influence," "own route/other route(s)," and "display time," are associated with each other. The "degree of influence" is the degree of influence of the operation status on the passengers, and the types of the "degree of influence" include "significant," "large," "small," and "none." The "own route/other route(s)" indicates that the route in which, for example, an accident or trouble due to weather has occurred is the own route or other route(s).

The "display sequence" is information indicating the display sequence for the operation information according to the "degree of influence". When the "degree of influence" is "significant," the "display sequence" is "s1". When the "degree of influence" is "large," the "display sequence" is "s2". When the "degree of influence" is "small", the "display sequence" is "s3". When the "degree of influence" is "none", the "display sequence" is "s4". The "display time" is the information indicating the time for which the operation information is displayed. When the "display time" is "long", the operation information is displayed for a long time. When the "display time" is "short", the operation information is displayed for a time shorter than the time when the "display time" is "long". When the "display time" is "medium", the operation information is displayed for a time shorter than the time when the "display time" is "long" and longer than the time when the "display time" is "short".

When, for example, the route on which the accident or trouble due to weather has occurred is the "own route" and the operation suspension time or the operation delay time of the train is equal to or longer than a predetermined time (for example, 10 minutes), the operation information distribution unit 62 determines that the degree of influence on the passengers is "significant".

When, for example, the route on which the accident or trouble due to weather has occurred is "other route(s)" and the operation suspension time or the operation delay time of the train is equal to or longer than the predetermined time (for example, 10 minutes), the operation information distribution unit 62 determines that the degree of influence on the passengers is "large".

When, for example, the operation suspension time or the operation delay time of the train is less than the predetermined time (for example, 10 minutes), the operation information distribution unit 62 determines that the degree of influence on the passengers is "small". Each display sequence reading circuit 11 determines that the influence on the passengers is "none" when no operation information has been received.

The operation information distribution unit 62 determines the influence on the passengers of a transmission destination train and transmits the determination result as influence information to the train. When the degree of influence is "significant," "large," or "small," the display sequence reading circuit 11 of the instruction output device 41 determines a display sequence on the basis of the influence information from the ground system 71 and inputs the determination result to the interrupt generation circuit 13. In the present embodiment, upon reception of, for example, operation information, each display sequence reading circuit 11 inputs the information indicating the influence on passengers to the corresponding interrupt generation circuit 13. The interrupt generation circuit 13 inputs an interrupt instruction to the display instruction circuit 12. When there is an influence on the passengers, the display sequence reading circuit 11 inputs the result of the determination of the degree of influence ("significant," "large," or "small") to the display instruction circuit 12.

The display instruction circuits 12 extract display sequences according to the results from the display sequence storage circuits 14 and transmit display instructions to the content display units 51 to 54 so that the operation information, advertisement information, and guidance information are displayed in the extracted display sequences. More specifically, the instruction output devices 41 to 44 have stored the display sequences s1 to s4 corresponding to the display instructions from the train information device 3 and issue instructions for displaying the operation information and the like in one of the display sequences s1 to s4 to the content display units 51 to 54 (step S140). In this manner, the content display units 51 to 54 display the operation information, advertisement information, and guidance information in the display sequence based on the result of the determination of the degree of influence.

During normal operations, the display instruction circuits 12 transmit display instructions to the content display units 51 to 54 so that the advertisement information and guidance information are displayed in the display sequence "s4" used for the display for normal operations and stored in the display sequence storage circuits 14.

FIGS. 7 and 8 are diagrams showing examples of the display sequence during normal operations. FIG. 7 shows the display sequence "s4" (sequence information 91A) for the information (passenger guidance information) to be displayed in a display area 81 on a side on which doors are opened (a door-opening side). FIG. 8 shows the display sequence "s4" (sequence information 91B) for the information to be displayed on a display area 81 on a side on which doors remain closed (a closed-door side).

In each of the sequence information 91A and the sequence information 91B, information to be displayed while the train stops at a station, information to be displayed after the train starts running and until notice of the next station is displayed, information to be displayed when the train reaches a position a predetermined distance from the stop, and the like are set as passenger guidance displays.

A message such as "We are at AA station", "the next is BB", or "we will soon arrive at BB" is displayed in a guidance area A according to the running status of the train. A plurality of guidance (guidance content) are sequentially displayed on a guidance area B.

For example, as shown in the sequence information 91A, while the train stops at a station, a message such as "We are at AA station" is displayed on the guidance area A on the door-opening side, and guidance content A1 is displayed on the guidance area B on the door-opening side. As shown in the sequence information 91B, while the train stops at the station, a message such as "We are at AA station" is displayed on the guidance area A on the closed-door side, and guidance content A1 is displayed on the guidance area B on the door-opening side. When the train is running, guidance content B1 to guidance content B7 are displayed on the guidance areas B on the door-opening side and on the closed-door side. After all the guidance content B1 to guidance content B7 have been displayed on the guidance areas B during running of the train, these guidance content B1 to guidance content B7 are repeatedly displayed on the guidance areas B. In this example, the number of guidance contents is seven (B1 to B7). Alternatively, the number of guidance contents may be 6 or less or 8 or more.

When the "degree of influence" is "significant," the display instruction circuits 12 transmit display instructions to the content display units 51 to 54 so that the operation information, advertisement information, and guidance information are displayed in the display sequence "s1." Therefore, in the advertisement indicators (the content display units 52 and 54), the advertisement displayed during normal operations is interrupted, and a route map for an operation-suspended section is displayed (over the entire screens). In the destination guidance indicators (the content display units 51 and 53), the operation information and guidance information are displayed in the display sequence "s1".

The interrupt timing at which the route map for the operation-suspended section is displayed on the advertisement indicators (the display instruction) based on the display instructions from the display instruction circuits 12 (or the train information device 3), is the same as the time at which the instructions for displaying the operation information on the destination guidance units are issued (the timing at which the guidance information currently displayed is erased). Therefore, the display of the route map for the operation-suspended section on the advertisement indicators is synchronized with the display of the operation information on the destination guidance indicators.

FIGS. 9 and 10 are diagrams showing examples of the display sequence when the degree of influence on the passengers is significant. FIG. 9 shows the display sequence "s1" (sequence information 201A) for the information (operation information, advertisement information, and guidance information) to be displayed on the display area 81 on the door-opening side. FIG. 10 shows the display sequence "s1" (sequence information 201B) for the information to be displayed on the display area 81 on the closed-door side.

In each of the sequence information 201A and the sequence information 201B, information to be displayed while the train stops at a station, information to be displayed after the train starts running and until notice of the next station is displayed, information to be displayed when the train reaches a position the predetermined distance from the stop, and the like are set.

A message such as "We are at AA station," "the next is BB," or "we will soon arrive at BB" is displayed in the guidance area A according to the running status of the train. The operation information and a plurality of guidance such as route guidance are sequentially displayed on the guidance area B according to the running status of the train. The information on the operation-suspended route (an operation-suspended route map) is continuously displayed on the advertisement indicators (the content display units 52 and 54).

For example, as shown in the sequence information 201A, while the train stops at a station, a message such as "We are at AA station" is displayed on the guidance area A on the door-opening side, and the operation information is displayed on the guidance area B on the door-opening side.

After the train starts running and until notice of the next station is displayed, the operation information, guidance content B1, and guidance content B2 are repeatedly and sequentially displayed on the guidance area B on the door-opening side. In the above example, two guidance contents including the guidance content B1 and the guidance content B2 are displayed. Alternatively, only one guidance content or three or more guidance contents may be displayed. During the above period, the operation information is continuously displayed on the guidance area B on the door-opening side. After the train reaches a position a predetermined distance (Z1) from the stop, the operation information is continuously displayed on the guidance area B on the door-opening side until the guidance for the side on which doors will open is displayed. When the train reaches a position a predetermined distance (Z2) (Z1>Z2) from the stop, guidance content C2 is displayed on the guidance area B on the door-opening side. After the train reaches a position the predetermined distance (Z1) from the stop, the operation information is continuously displayed on the guidance area B on the door-opening side.

As shown in the sequence information 201B, while the train stops at a station, a message such as "We are at AA station" is displayed on the guidance area A on the closed-door side, and the operation information is displayed on the guidance area B on the closed-door side. After the train starts running and until notice of the next station is displayed, the operation information, the guidance content B1, and the guidance content B2 are repeatedly and sequentially displayed on the guidance area B on the closed-door side. In the above example, two guidance content including the guidance content B1 and the guidance content B2 are displayed. Alternatively, only one guidance content or three or more guidance contents may be displayed. During the above period, the operation information is continuously displayed on the guidance area B on the closed-door side. After the train reaches the position the predetermined distance (Z1) from the stop, the operation information is continuously displayed on the guidance area B on the closed-door side until the guidance for the side on which doors remain closed is displayed. When the train reaches the position the predetermined distance (Z2) (Z1>Z2) from the stop, the guidance content C2 is displayed on the guidance area B on the closed-door side. After the train reaches the position the predetermined distance (Z1) from the stop, the operation information is continuously displayed on the guidance area B on the closed-door side.

If the train departs while the operation information for stoppage time is being displayed, the operation information is displayed from the beginning on the guidance area B on the door-opening side when the train reaches the position the predetermined distance (Z1) from the stop or when the train arrives at the next station and doors are opened.

When the "degree of influence" is "large," the display instruction circuits 12 transmit display instructions to the content display units 51 to 54 so that the operation information, advertisement information, and guidance information are displayed in the display sequence "s2." FIGS. 11 and 12 are diagrams showing examples of the display sequence when the degree of influence on passengers is large. FIG. 11 shows the display sequence "s2" (sequence information 202A) for the information (operation information, advertisement information, and guidance information) to be displayed on the display area 81 on the door-opening side. FIG. 12 shows the display sequence "s2" (sequence information 202B) for the information to be displayed on the display area 81 on the closed-door side.

In each of the sequence information 202A and the sequence information 202B, information to be displayed while the train stops at a station, information to be displayed after the train starts running and until notice of the next station is displayed, information to be displayed when the train reaches a position a predetermined distance from the stop, and the like are set.

A message such as "We are at AA station," "the next is BB," or "we will soon arrive at BB" is displayed in the guidance area A according to the running status of the train. A plurality of types of guidance such as route guidance are sequentially displayed on the guidance area B. An operation-suspended route map and advertisement are displayed on the advertisement indicators (the content display units 52 and 54) according to the running conditions of the train.

For example, as shown in the sequence information 202A, while the train stops at a station, a message such as "We are at AA station" is displayed on the guidance area A on the door-opening side, and the operation information is displayed on the guidance area B on the door-opening side. In this case, the operation-suspended route map is displayed on the advertisement indicators.

After the train starts running and until notice of the next station is displayed, guidance content B1 to guidance content B3, the operation information, and guidance content B4 to guidance content B7 are repeatedly and sequentially displayed on the guidance area B on the door-opening side. In this example, three guidance contents including the guidance content B1 to B3 are displayed. Alternatively, two or less guidance contents or four or more guidance contents may be displayed. In addition, four guidance contents including the guidance content B4 to B7 are displayed. Alternatively, three or less guidance contents or five or more guidance contents may be displayed.

Each time the train departs from a station and starts running, the operation information is displayed from the beginning on the guidance area B on the door-opening side. When the operation information is displayed on the guidance area B, the operation-suspended route map is displayed on the advertisement indicators.

After the train reaches a position a predetermined distance (Z1) from a stop, guidance content C1 is displayed on the guidance area B on the door-opening side until the guidance for the side on which doors will open is displayed. When the train reaches a position a predetermined distance (Z2) (Z1>Z2) from the stop, guidance content C2 is displayed on the guidance area B on the door-opening side.

As shown in the sequence information 202B, while the train stops at the station, a message such as "We are at AA station" is displayed on the guidance area A on the closed-door side, and the operation information is displayed on the guidance area B on the closed-door side. In this case, the operation-suspended route map is displayed on the advertisement indicators.

After the train starts running and until notice of the next station is displayed, information is displayed on the guidance area B and the advertisement indicators on the closed-door side in the same sequence as the display sequence in the sequence information 202A.

After the train reaches a position a predetermined distance from the stop, information is displayed on the guidance area B and the advertisement indicators on the closed-door side in the same sequence as the display sequence in the sequence information 202A. If the train departs while the operation information for stoppage time is being displayed, the operation information is displayed from the beginning on the guidance area B on the door-opening side when the train arrives at the next station and doors are opened.

As shown in FIGS. 9 to 12, the preset time for displaying the operation information and the operation-suspended route is longer in the sequence information 201A and the sequence information 201B that are used when the degree of influence on passengers is "significant" than in the sequence information 202A and the sequence information 202B that are used when the degree of influence on passengers is "large." Therefore, when the degree of influence on passengers is "significant," the operation information and the operation-suspended route can be displayed on the door-opening side and the closed-door side for a longer time than when the degree of influence on passengers is "large".

When the "degree of influence" is "small," the display instruction circuits 12 instruct the operation information, advertisement information, and guidance information to be displayed in the display sequence "s3". FIGS. 13 and 14 are diagrams showing examples of the display sequence when the degree of influence on passengers is small. FIG. 13 shows the display sequence "s3" (sequence information 203A) for the information (operation information, advertisement information, and guidance information) to be displayed on the display area 81 on the door-opening side. FIG. 14 shows the display sequence "s3" (sequence information 203B) for the information to be displayed on the display area 81 on the closed-door side.

In each of the sequence information 203A and the sequence information 203B, information to be displayed while the train stops at a station, information to be displayed after the train starts running and until notice of the next station is displayed, information to be displayed when the train reaches a position a predetermined distance from the stop, and the like are set.

A message such as "We are at AA station", "the next is BB", or "we will soon arrive at BB" is displayed in the guidance area A according to the running status of the train. The operation information and a plurality of types of guidance such as route guidance are sequentially displayed on the guidance area B according to the running status of the train. In this case, advertisement is continuously displayed on the advertisement indicators (the content display units 52 and 54).

Information according to the sequence information 203A is displayed on the guidance area B on the door-opening side in the same sequence as the display sequence in the sequence information 202A. In the present embodiment, the sequence information 202A and the sequence information 203A are set so that the time for displaying the operation information is longer in the information display according to the sequence information 202A than in the information display according to the sequence information 203A. In this manner, when the degree of influence on passengers is "large", the operation information can be displayed on the door-opening side for a longer time than when the degree of influence on passengers is "small".

On the guidance area B on the closed-door side, information according to the sequence information 203B is displayed in the same sequence as the display sequence in the sequence information 202B. In the present embodiment, the sequence information 202B and the sequence information 203B are set so that the time for displaying the operation information is longer in the information display according to the sequence information 202B than in the information display according to the sequence information 203B. In this manner, when the degree of influence on passengers is "large," the operation information can be displayed on the closed-door side for a longer time than when the degree of influence on passengers is "small."

Figure 15:
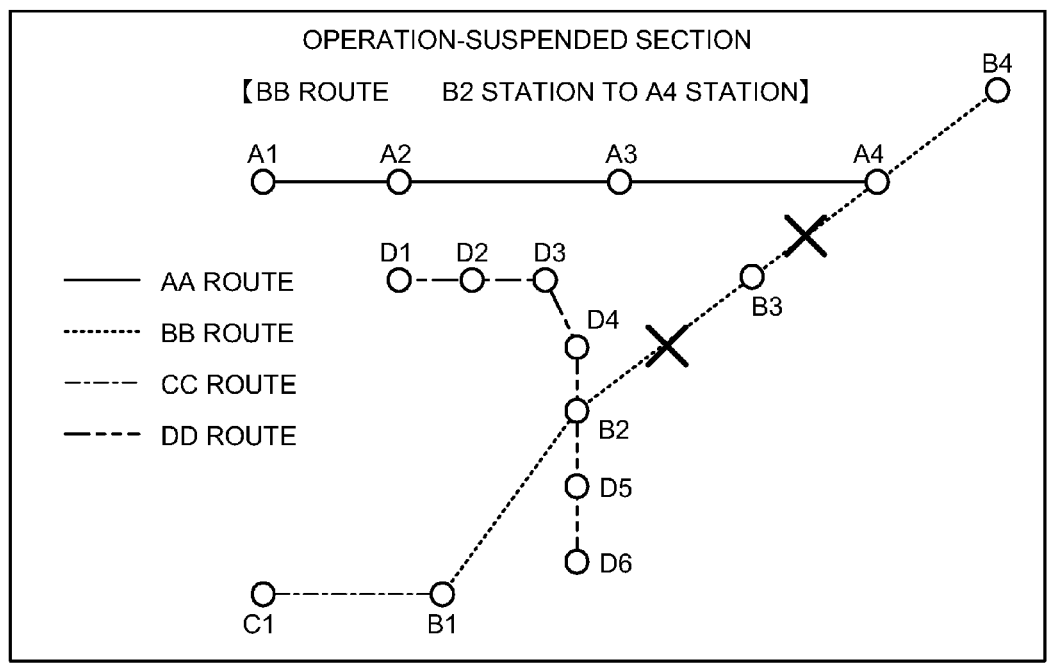
FIG. 15 is a diagram showing one example of the display (on a mountain side) of an operation-suspended section.
Figure 16:
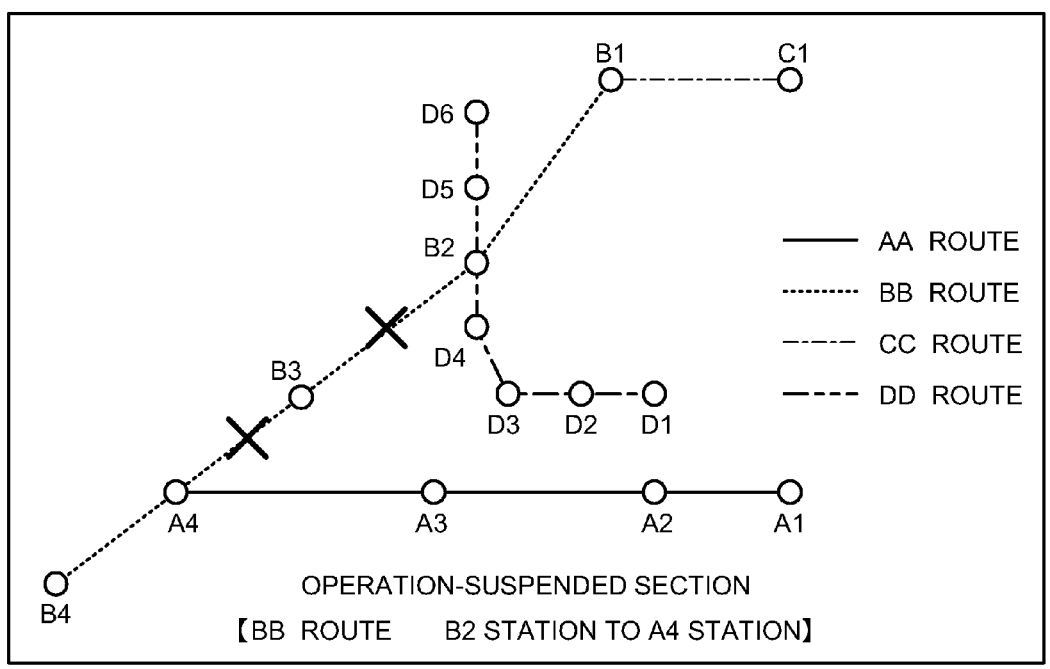
FIG. 16 is a diagram showing one example of the display (on a sea side) of the operation-suspended section.

Next, examples of the display of an operation-suspended route (operation-suspended section) will be described. FIGS. 15 and 16 are diagrams showing examples of the display of the operation-suspended section. FIG. 15 is an example of the operation suspended section displayed on an advertisement indicator (content display unit 52) arranged near doors on a mountain side, and FIG. 16 is an example of the operation suspended section displayed on an advertisement indicator (content display unit 54) arranged near doors on a sea side.

On each of the advertisement indicators, the route on which the train runs, a route to which the passengers of the train can change, a route to which the passengers of the train cannot change, and the like are displayed. For example, all the routes currently owned by the railway company are displayed on the advertisement indicators. Main stations of the routes are also displayed together with the routes. The routes and the main stations are displayed on the advertisement indicators so that the directions (the arrangement directions) toward the first stations and the last stations on the route maps in FIGS. 15 and 16 correspond to the actual directions toward the stations when the advertisement indicators are viewed from the front. The section in which operations have been suspended is indicated by, for example, crosses. In FIGS. 15 and 16, a section from station B2 to station A4 on route BB is an operation-suspended section.

Next, a description will be given of an operation-suspended section code that is received by the train X1 from the operation information distribution unit 62 together with operation information. The display instruction circuits 12 extract an operation-suspended section corresponding to an operation-suspended section code and instruct the advertisement indicators to display the extracted operation suspended section using, for example, crosses. In this case, each display instruction circuit 12 extracts an operation-suspended section corresponding to the received operation-suspended section code from operation-suspended section information described later (information indicating the correspondence between the operation-suspended section code and the operation-suspended section).

Figures 17, 18:
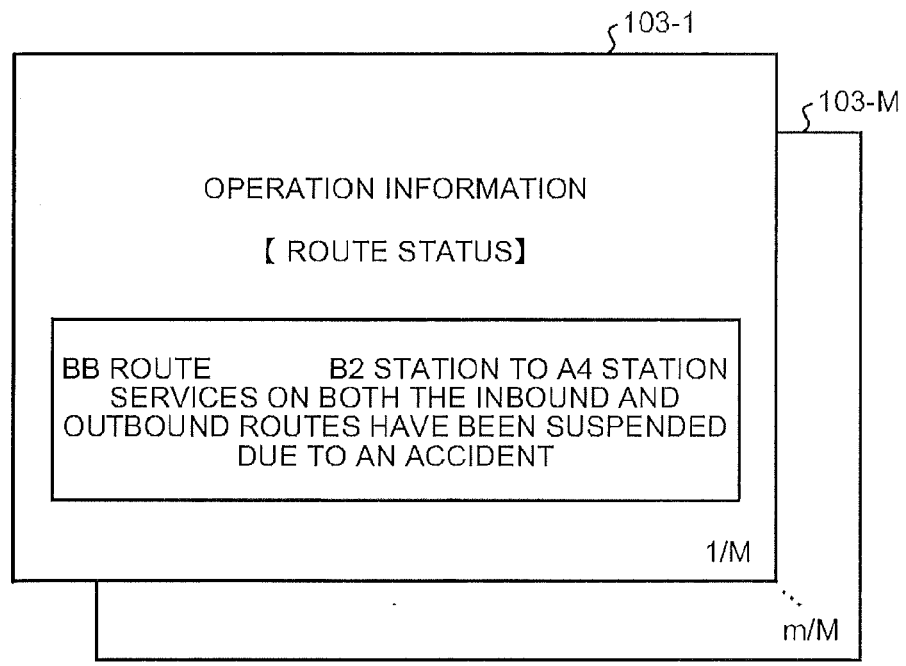
FIG. 17 is a diagram showing one example of the operation-suspended section information.
FIG. 18 is a diagram showing an example of the display of operation information.

FIG. 17 is a diagram showing an example of the operation-suspended section information. The operation-suspended section information is an information table in which the items "operation suspended section code", "route", "operation suspended section", and "displayed route name" are associated with each other. For example, the "operation-suspended section code" when the "route" is "AA" and the "operation-suspended section" is "A1 to A3 (from station A1 to station A3)" is "001". When an operation suspended section is displayed on the advertisement indicators, a route name indicated in the "displayed route name" is displayed. In the description for FIG. 17, the operation-suspended section information includes four information items (elements). Alternatively, the operation-suspended section information may include three or less information items or five or more information items.

Next, a description will be given of an example of the operation information displayed on a guidance area B83. FIG. 18 is a diagram illustrating an exemplary display of operation information. Operation information 103-1 to operation information 103-M each including, for example, the name of an operation-suspended route and an operation suspended section are separately displayed on a guidance area B83 (in a text input format (plain format)).

In the guidance area B83, a title is displayed on, for example, the first line. The display of the body of operation information is started form the second line. The body displayed on the guidance area B83 starts from the names of station B2 and station A4 on line BB, and a message such as "Services on both the inbound and outbound routes have been suspended due to an accident" is displayed as the operation status in this section.

When there are a plurality of pieces of operation information, each piece of operation information may be displayed in a text input format. When there is only one piece of operation information, the operation information may be displayed in a text input format. When there are a plurality of pieces of operation information, for example, one piece of operation information is displayed on one display screen (page). When the next operation information is displayed, the display is switched to the next display screen (page) to display the operation information. In this manner, the pieces of operation information are sequentially displayed in a text input format. Incidentally, the amount of operation information that can be displayed on one screen is limited. Therefore, when operation information including more than a predetermined number of characters (for example, 120 characters), another screen is also used, and the operation information is displayed on a plurality of screens.

When there are a plurality of pieces of operation information, the plurality of pieces of operation information 103-1 to 103-M may be sequentially displayed on the guidance area B83 (in a text input format) or may be displayed simultaneously as a list (operation information list 104 described later) (in a table format). FIG. 19 is a diagram showing an exemplary display when a plurality of pieces of operation information are displayed simultaneously. Alternatively, the plurality of pieces of operation information 103-1 to 103-M may be first displayed sequentially in a text input format and then displayed simultaneously as a list. Alternatively, the plurality of pieces of operation information 103-1 to 103-M may be first displayed simultaneously as a list and then displayed sequentially in a text input format. When there is only one piece of operation information, the operation information may be displayed in a table format. Alternatively, the one piece of operation information may be first displayed in a text input format and then displayed in a table format. The one piece of operation information may be first displayed in a table format and then displayed in a text input format.

In the operation information list 104, the items "route," "section," "direction," "status," and "cause" are associated with each other. The "route" is information indicating a route (the name of a route) such as route AA or route BB, and the section is information indicating an operation-suspended section. The "direction" is information indicating that operations on one or both of the inbound and outbound routes in the operation-suspended section are suspended. The "status" is information indicating the operation status such as suspension of the operations or resumption of the operations, and the "cause" is information indicating the cause of, for example, the suspension of the operation (such as an accident or weather). In the operation information list 104, the "route", "section", "direction", "status", and "cause" in each of a plurality of pieces of information are displayed as a list, and the plurality of pieces of operation information are thereby displayed simultaneously. The operation information list 104 is not limited to include five information items of the "route", "section", "direction", "status", and "cause". The operation information list 104 may include four or less information items or six or more information items.

The display of operation information and the like in any of the display sequences "s1" to "s3" is reset to the information display for normal operations when resumption information (resumption of the operation suspension) is received from the operation information distribution center 61 or when an operator (such as the conductor) of the train X1 inputs an instruction for disabling the display of the operation information (or selects a display disable key).

Upon reception of resumption information, the operation information stored in the instruction output device 41 (the operation information designated by the resumption information) is erased, and the operation information displayed on the destination guidance indicator is erased. When an instruction for disabling the display of the operation information is inputted (an erase instruction procedure is performed), the operation information is erased at the next display timing for the operation information. In each advertisement indicator, the route map for the operation-suspended section is erased at the same timing as the timing at which the operation information on each destination guidance indicator is erased.

When the route map for an operation-suspended section is displayed on each advertisement indicator, the time for displaying the route map for the operation-suspended section may be added to the display history record of the advertisement display. In the present embodiment, operation information and the route map for an operation-suspended section are displayed using two display screens of the advertisement indicator and the destination guidance indicator. Alternatively, the operation information and the route map for an operation-suspended section may be displayed on one display screen. The display sequences shown in FIG. 7 to FIG. 14 are only examples. Operation information and the route map for an operation suspended section may be displayed in any other display sequences.

As described above, according to the first embodiment, when an accident, for example, has occurred in a route, operation information and the like are displayed, on the basis of the degree of influence on the passengers of the train X1, in a display sequence based on the degree of influence. Therefore, efficient operation information based on the degree of influence on the passengers can be provided to the passengers.

Accordingly, when the degree of influence on the passengers is large, the operation information can be displayed for a long time. When the degree of influence on the passengers is small, the operation information is displayed only for a short time, and therefore the display of advertisement information and the display of guidance information are prevented from being interrupted unnecessarily.

Since the operation information is displayed together with the route map for an operation-suspended section, the passengers can easily recognize the operation-suspended section. When there are a plurality of pieces of operation information, the plurality of pieces of operation information are displayed simultaneously in a table format. Therefore, the plurality of pieces of operation information can be given to the passengers in an easy-to-understand manner.

Since various display sequences for different degrees of influence on passengers are stored in advance in the display sequence storage circuit 14, operation information and the like can be easily displayed in a display sequence based on the degree of influence on the passengers.

The operation information includes the information on the suspension of the operations of a train. Therefore, when the operations of a train are suspended and this has an influence on the passengers of the train, the operation information and the like can be displayed in a display sequence based on the degree of influence on the passengers.

Since the degree of influence on the passengers of a train is determined on the basis of whether the operations of the own route or the other route(s) are suspended, the degree of influence on the passengers can be easily and appropriately determined. Since the degree of influence on the passengers of the train is determined on the basis of the operation delay time of the train, the degree of influence on the passengers can be easily and appropriately determined.

In addition, the information on the route on which the operations of trains are suspended, the information on the section in which the operations of the trains are suspended, the information on the operation direction in which the operations of the trains are suspended, and the information on the cause of the suspension of the operations of the trains are displayed as the operation information. Therefore, suitable and detailed operation information can be provided to the passengers.

Second Embodiment

A second embodiment of the present invention will next be described with reference to FIGS. 1, 2, 20, and 21. In the second embodiment, the train information distribution device (influence determination unit) 1 of a train determines whether the operations of the own route or the other route(s) are suspended and also determines the degree of influence (significant, normal, and the like) of the operation status on the passengers.

A train information distribution system according to the second embodiment of the present invention has a structure similar to the structure of the train information distribution system 100 according to the first embodiment shown in FIGS. 1 and 2, and a redundant description is omitted.

In the train X1 in the present embodiment, a transmission-reception device 64 and a train information distribution device 1 for distributing the operation information and the like received by the transmission-reception device 64 to the vehicles T1 to Tn are arranged on the front vehicle T1.

In the train information distribution system 100 in the present embodiment, a single piece of operation information is transmitted from the operation information distribution center 61 to the trains X1 to Xm. Then the transmission-reception devices 64 of the trains X1 to Xm input the received operation information to the respective train information distribution devices 1. The train information distribution device 1 of each train analyzes the operation information and determines, on the basis of the analysis results, the influence of the operation status (for example, the information on suspended operations) in the operation information on the passengers of a train X1. Then the train information distribution device 1 transmits instruction information (a display instruction) to the train information device 3 so that the operation information is displayed in a display sequence based on the degree of influence on the passengers of the train X1.

The train information device 3 is connected to each of the instruction output devices 41 to 44 and inputs the instruction information and the operation information from the train information distribution device 1 to the instruction output devices 41 to 44. The instruction output devices 41 to 44 instruct the content display units 51 to 54 to display the operation information in predetermined display sequences according to the instruction information from the train information device 3. The content display units 51 to 54 display the operation information from the train information distribution device 1 and the advertisement information and guidance information from the content data server 65.

Figure 20:
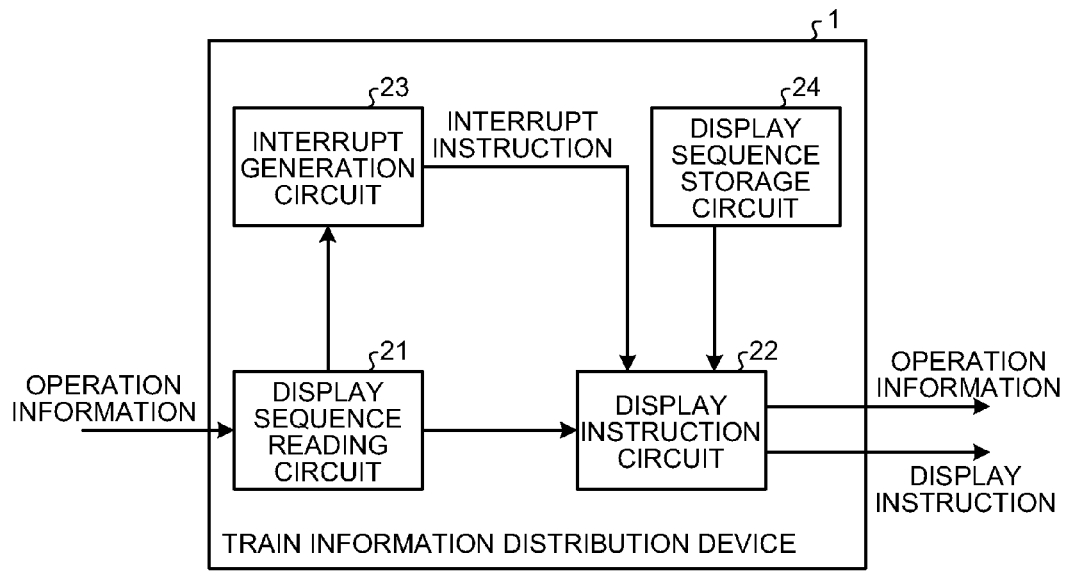
FIG. 20 is a block diagram illustrating the structure of a train information distribution device in a second embodiment.

The structure of the train information distribution device 1 will next be described in detail. FIG. 20 is a block diagram illustrating the structure of the train information distribution device according to the second embodiment. The train information distribution device 1 includes a display sequence reading circuit 21, an interrupt generation circuit 23, a display instruction circuit 22, and a display sequence storage circuit (display sequence storage unit) 24. The display sequence reading circuit 21 is connected to the interrupt generation circuit 23 and the display instruction circuit 22, and the display instruction circuit 22 is connected to the display sequence storage circuit 24.

The display sequence reading circuit 21 is a circuit that determines, on the basis of the operation information transmitted from the transmission-reception device 64, the influence of the operation status indicated in the operation information on the passengers of the train X1. The display sequence reading circuit 21 inputs the determination result to the interrupt generation circuit 23. For example, if an accident has occurred in the operation route of the train X1, the display sequence reading circuit 21 inputs the determination result indicating a large degree of influence on the passengers to the interrupt generation circuit 23. When a determination has been made that there is an influence on the passengers of the train X1 (the degree of influence: "significant" or "small"), the display sequence reading circuit 21 transmits the operation information transmitted from the transmission-reception device 64 to the display instruction circuit 22.

The interrupt generation circuit 23 is a circuit similar to the interrupt generation circuit 13 and outputs an interrupt instruction to the display instruction circuit 22 upon reception of the determination result indicating that there is an influence on the passengers of the train X1, from the display sequence reading circuit 21.

The display sequence storage circuit 24 is a circuit similar to the display sequence storage circuit 14 and stores the display sequence for the advertisement information and guidance information to be displayed during normal operations and the display sequence for the operation information, advertisement information, and guidance information to be displayed when a trouble has occurred. The display sequence storage circuit 24 stores various display sequences for different degrees of influence on the passengers in advance.

The display instruction circuit 22 outputs a display instruction to the train information device 3 so that the operation information, advertisement information, guidance information, and the like are displayed in predetermined order in a display sequence stored in the display sequence storage circuit 24.

During normal operations, the display instruction circuit 22 outputs a display instruction to the train information device 3 so that advertisement information and guidance information are displayed in a display sequence used for normal operations and stored in the display sequence storage circuit 24.

Upon reception of an interrupt instruction from the interrupt generation circuit 23 (upon occurrence of a trouble in a route), the display instruction circuit 22 outputs a display instruction to the train information device 3 so that the operation information, advertisement information, and guidance information are displayed in a display sequence stored in the display sequence storage circuit 24, these information being used when a trouble has occurred (a display sequence based on the degree of influence on the passengers).

A description will be given of the operation information propagating throughout the train information distribution system 100 according to the present embodiment. If an accident, for example, has occurred in a train route, operation information is transmitted from the operation information distribution center 61 to the trains X1 to Xm in the train information distribution system 100. The operation information transmitted from the operation information distribution center 61 is transmitted to the operation information distribution unit 62 through the communication line 67.

The operation information distribution unit 62 transmits the operation information to vehicle-mounted systems 75 through the packet transmission line 68. The central control system 72 and the information display system 73 shown in FIG. 2 correspond to such a vehicle-mounted system 75.

The transmission-reception device 64 of the vehicle-mounted system 75 (the central control system 72) receives the operation information from the ground system 71 (the operation information distribution unit 62). The transmission-reception device 64 transmits the received operation information to the train information distribution device 1 as operation information. When the operation status indicated in the operation information is an operation status that has an influence on the passengers of a train (for example, when an accident, for example, has occurred in the route on which the train runs), the train information distribution device 1 transmits the operation information to the instruction output devices 41 to 44 through the train information device 3. The instruction output devices 41 to 44 instruct the content display units 51 to 54 to display the operation information from the train information device 3. Since the advertisement information (video and still images) and guidance information are displayed on the content display units 51 to 54 through the same processing as that in the first embodiment, the description thereof is omitted.

Figure 21:
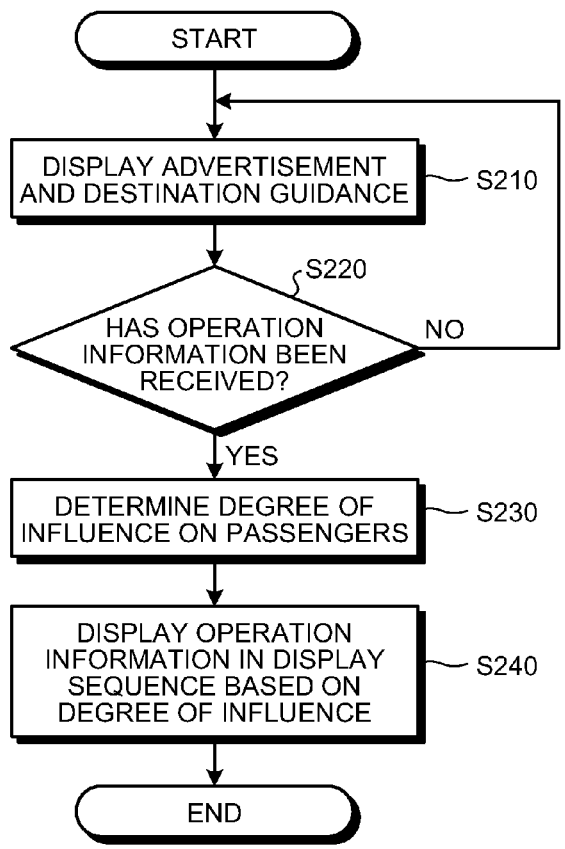
FIG. 21 is a flowchart showing the operation procedure in the train information distribution device according to the second embodiment.

Next, a description will be given of the operation procedure in the train information distribution system 100 (the train information distribution device 1). FIG. 21 is a flowchart showing the operation procedure in the train information distribution device according to the second embodiment. During normal operations, the display instruction circuit 22 of the train information distribution device 1 extracts a display sequence for normal operations from the display sequence storage circuit 24 and transmits a display instruction for the extracted display sequence (a display instruction for displaying advertisement information and guidance information) to the train information device 3. The train information device 3 transmits the display instruction received from the train information distribution device 1 to each of the instruction output devices 41 to 44. The instruction output devices 41 to 44 receive the advertisement information and guidance information from the content data server 65 and instruct the content display units 51 to 54 to display the advertisement information and guidance information in a display sequence based on the display instruction from the train information device 3. The content display units 51 and 53 display guidance (such as destination guidance) corresponding to the guidance information, and the content display units 52 and 54 display advertisement corresponding to the advertisement information (step S210).

Then the display sequence reading circuit 21 of the train information distribution device 1 monitors whether or not any operation information has been received from the operation information distribution center 61. If the display sequence reading circuit 21 has received no operation information (step S220: No), a determination result indicating no influence on the passengers is inputted to the display instruction circuit 22. Therefore, the display instruction circuit 22 continues the processing for transmitting, to the train information device 3, the instruction for displaying advertisement information and guidance information in the display sequence for normal operations that has been extracted from the display sequence storage circuit 24. The train information device 3 transmits the display instruction to the instruction output devices 41 to 44, and the instruction output devices 41 to 44 instruct the content display units 51 to 54 to display the advertisement information and guidance information in the display sequence based on the display instruction (step S210).

If the display sequence reading circuit 21 receives operation information (step S220: yes), the display sequence reading circuit 21 determines the influence of the operation status indicated in the received operation information on the passengers of the train X1. The operation information received by the display sequence reading circuit 21 is information indicating that, for example, "the operations of the AA route have been suspended between A1 station and A3 station."

The display sequence reading circuit 21 determines the degree of influence on the passengers on the basis of, for example, the determination as to whether the route in which, for example, an accident or trouble due to weather has occurred is the own route (the route on which the train runs) or the other route(s) (a route on which the train does not run), of the suspension time of the operations (expected suspension time), or of the operation delay time of the train (step S230). In this process, the display sequence reading circuit 21 may determine that the accident that has occurred in a route having tracks shared by the own route causes suspension of the operations of the own route or suspension of the operations of the other route(s).

As in the display sequence reading circuit 11 in the first embodiment, the display sequence reading circuit 21 in the preset embodiment determines the degree of influence of the operation status on the passengers on the basis of, for example, the influence information table 102 shown in FIG. 6.

When there is an influence on the passengers (when the degree of influence is "significant," "large," or "small"), the display sequence reading circuit 21 inputs the information indicating the presence of the influence on the passengers (the determination result) to the interrupt generation circuit 23. For example, upon reception of operation information, the display sequence reading circuit 21 in this embodiment inputs the information indicating the presence of the influence on the passengers to the interrupt generation circuit 23. The interrupt generation circuit 23 inputs an interrupt instruction to the display instruction circuit 22. In addition, when there is an influence on the passengers, the display sequence reading circuit 21 inputs the result of the determination of the degree of influence ("significant," "large," or "small") to the display instruction circuit 22.

The display instruction circuit 22 extracts a display sequence based on the result of the determination of the degree of influence from the display sequence storage circuit 24 and outputs a display instruction to the train information device 3 so that the operation information, advertisement information, and guidance information are displayed in the extracted display sequence. The display instruction is transmitted to the content display units 51 to 54 through the instruction output devices 41 to 44. Therefore, each of the content display units 51 to 54 displays the operation information, advertisement information, and guidance information in the display sequence based on the result of the determination of the degree of influence (step S240).

During normal operations, the display instruction circuit 22 outputs a display instruction to the train information device 3 so that the advertisement information and guidance information are displayed in the display sequence "s4" used for the display for normal operations and stored in the display sequence storage circuit 24.

When the "degree of influence" is "significant," the display instruction circuit 22 outputs a display instruction to the train information device 3 so that the operation information, advertisement information, and guidance information are displayed in the display sequence "s1."

When the "degree of influence" is "large," the display instruction circuit 22 outputs a display instruction to the train information device 3 so that the operation information, advertisement information, and guidance information are displayed in the display sequence "s2."

When the "degree of influence" is "small," the display instruction circuit 22 outputs a display instruction to the train information device 3 so that the operation information, advertisement information, and guidance information are displayed in the display sequence "s3."

As described above, according to the second embodiment, even when no influence information is transmitted from the operation information distribution unit 62 to each of the trains X1 to Xm, the train information distribution device 1 of each train determines whether the operations of the own route or the other route(s) are suspended and determines the degree of influence of the operation status on the passengers. Therefore, the same effects as those in the train information distribution system 100 in the first embodiment can be obtained. More specifically, when an accident, for example, has occurred in a route, operation information and the like are displayed, on the basis of the degree of influence on the passengers of the train X1, in a display sequence based on the degree of influence. Therefore, efficient provision of operation information to the passengers based on the degree of influence on the passengers can be achieved.

In addition, the train information distribution device 1 of each of the trains X1 to Xm determines whether the operations of the own route of the each train or the other route(s) are suspended and determines the degree of influence of the operation status on the passengers. Therefore, the determination can be made for each train, and operation information suitable for the each train can be displayed.

INDUSTRIAL APPLICABILITY

As described above, the train information display system and the train information display device of the present invention are suitable for displaying information on the operation status of trains.

The invention claimed is:

1. A train information display system, comprising: an operation information distribution system that distributes operation information on a train operation status of each of trains on a route; and a train information display device that receives the operation information from the operation information distribution system and displays the operation information in a vehicle of an own train on which the train information display device is arranged, wherein the operation information distribution system
determines a degree of influence due to the train operation status, which is related to a route in which an accident or a trouble due to weather occurs, and a time during which the route is to be suspended, and a delay time of the train, included in the operation information on a passenger of a train to which the operation information is to be transmitted, adds a determination result of the degree of influence to the operation information as influence information, and transmits the resultant operation information to the train information display device of the corresponding train, and the train information display device includes
a receiving unit that receives, from the operation information distribution system, the operation information to which the influence information has been added, an operation information storage unit that stores in advance, as normal-time display information, at least one of advertisement information and destination guidance information that are to be displayed during normal operations and are different from the operation information, an instruction output device that, when the receiving unit receives the operation information, outputs a display instruction for displaying the operation information and the normal-time display information in a display sequence corresponding to the influence information, and a display unit that simultaneously displays the operation information and the normal-time display information in the display sequence based on the display instruction from the instruction output device, changing a display format in such a manner that two or more pieces of the operation information are displayed in order or a list of two or more pieces of the operation information is displayed, according to the influence information.

2. The train information display system according to claim 1, wherein the instruction output device includes a display sequence storage unit that stores a display sequence for the influence information, the display sequence being corresponding to the influence information, and the instruction output device outputs the display instruction for displaying the operation information and the normal-time display information in the display sequence stored in the display sequence storage unit.

3. The train information display system according to claim 1, wherein the train operation status is operation-suspended information on operation suspension of a train.

4. The train information display system according to claim 3, wherein the operation-suspended information is information indicating that the operation suspension has occurred in an own route on which the own train runs or information indicating that the operation suspension has occurred in one or more of other routes on which the own train does not run, and the operation information distribution system determines the degree of influence according to whether the operations of the own route or the one or more of other routes have been suspended.

5. The train information display system according to claim 3, wherein the operation-suspended information is an operation delay time of the train, and the operation information distribution system determines the degree of influence according to the operation delay time of the train.

6. The train information display system according to claim 3, wherein the operation-suspended information includes at least one of information on a route on which the operation of the train has been suspended, information on a section in which the operation of the train has been suspended, information on an operation direction in which the operation of the train has been suspended, and information on a cause of the operation suspension of the train.

7. The train information display system according to claim 1, wherein the operation information includes a route map for an operation-suspended section.

8. The train information display system according to claim 1, wherein the display unit displays a title of the operation information on a first line in the operation information and displays contents of the operation information in a text input format from a second line in the operation information.

9. The train information display system according to claim 8, wherein, when the operation information includes a single piece of operation information, the display unit displays the piece of operation information in the text input format.

10. The train information display system according to claim 8, wherein, when the operation information includes a plurality of pieces of operation information, the display unit displays the plurality of pieces of operation information sequentially in the text input format.

11. The train information display system according to claim 1, wherein the display unit displays the operation information in a table format.

12. The train information display system according to claim 11, wherein, when the operation information includes a plurality of pieces of operation information, the display unit displays the plurality of pieces of operation information as a list in the table format.

13. The train information display system according to claim 11, wherein, when the operation information includes a single piece of operation information, the display unit displays the piece of operation information in the table format.

14. The train information display system according to claim 1, wherein, when the operation information includes a plurality of information, the display unit displays a title of the operation information on a first line in each of the operation information, displays contents of the operation information in order in a text input format from a second line in each of the pieces of operation information, and then displays the pieces of operation information as a list in a table format.

15. The train information display system according to claim 1, wherein, when the operation information includes a single piece of information, the display unit displays a title of the operation information on a first line in the operation information, displays contents of the operation information in a text input format from a second line in the operation information, and then displays the operation information in a table format.

16. The train information display system according to claim 1, wherein, when the operation information includes a plurality of pieces of information, the display unit displays the pieces of operation information as a list in a table format, then displays title of each of the pieces of operation information on a first line in each of the pieces of operation information, and displays contents of each of operation information in order in a text input format from a second line in each of the operation information.

17. The train information display system according to claim 1, wherein, when the operation information includes a single piece of information, the display unit displays the operation information in a table format, then displays a title of the operation information on a first line in the operation information, and displays contents of the operation information in a text input format from a second line in the operation information.

18. A train information display device that receives operation information on a train operation status of each of trains on a route from an operation information distribution system that distributes the operation information and displays the operation information in a vehicle of an own train on which the train information display device is arranged, the train information display device comprising:
- a receiving unit that receives, from the operation information distribution system, the operation information and influence information, the influence information being included in the operation information and related to a degree of influence on a passenger of a train due to a train operation status, the train operation status being related to a route in which an accident or a trouble due to weather occurs, a time during which the route is to be suspended, and a delay time of the train;
- an operation information storage unit that stores in advance, as normal-time display information, at least one of advertisement information and destination guidance information that are to be displayed during normal operations and are different from the operation information;
- an instruction output device that, when the receiving unit receives the operation information, outputs a display instruction for displaying the operation information and the normal-time display information in a display sequence corresponding to the influence information, and
- a display unit that simultaneously displays the operation information and the normal-time display information in the display sequence based on the display instruction from the instruction output device, changing a display format in such a manner that two or more pieces of the operation information are displayed in order or a list of two or more pieces of the operation information is displayed, according to the influence information.

19. A train information display device that receives operation information on a train operation status of each of trains on a route from an operation information distribution system that distributes the operation information and displays the operation information in a vehicle of an own train on which the train information display device is arranged, the train information display device comprising:
- a receiving unit that receives the operation information from the operation information distribution system;
- an operation information storage unit that stores in advance, as normal-time display information, at least one of advertisement information and destination guidance information that are to be displayed during normal operations and are different from the operation information;
- an influence determination unit that, when the receiving unit receives the operation information,
  - determines a degree of influence on a passenger of the own train, which is due to a train operation status included in the operation information, the train operation status being related to a route in which an accident or a trouble due to weather occurs, a time during which the route is to be suspended, and a delay time of the train, and outputs a determination result of the degree of influence as influence information;

an instruction output device that outputs a display instruction for displaying the operation information and the normal-time display information in a display sequence based on the influence information from the influence determination unit; and a display unit that displays the operation information and the normal-time display information in the display sequence based on the display instruction from the instruction output device.

* * * * *